United States Patent
Kato et al.

(10) Patent No.: US 12,358,333 B2
(45) Date of Patent: Jul. 15, 2025

(54) STRUCTURAL MEMBER

(71) Applicant: NIPPON STEEL CORPORATION, Tokyo (JP)

(72) Inventors: Ryoma Kato, Tokyo (JP); Ryo Tabata, Tokyo (JP); Takeshi Kawachi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/288,911

(22) PCT Filed: May 11, 2022

(86) PCT No.: PCT/JP2022/019907
§ 371 (c)(1),
(2) Date: Oct. 30, 2023

(87) PCT Pub. No.: WO2022/239794
PCT Pub. Date: Nov. 17, 2022

(65) Prior Publication Data
US 2024/0198746 A1    Jun. 20, 2024

(30) Foreign Application Priority Data

May 11, 2021 (JP) .................................. 2021-080138

(51) Int. Cl.
*B60G 7/00* (2006.01)

(52) U.S. Cl.
CPC ........ *B60G 7/001* (2013.01); *B60G 2206/122* (2013.01); *B60G 2206/722* (2013.01)

(58) Field of Classification Search
CPC .......................... B60G 7/001; B60G 2206/122
See application file for complete search history.

(56) References Cited

U.S. PATENT DOCUMENTS

| | | |
|---|---|---|
| 5,662,348 A | 9/1997 | Kusama et al. |
| 5,992,867 A | 11/1999 | Kato et al. |
| (Continued) | | |

FOREIGN PATENT DOCUMENTS

| | | | |
|---|---|---|---|
| DE | 102005008548 A1 * | 8/2006 | |
| EP | 1088606 A2 * | 4/2001 | ............. B21D 47/01 |
| (Continued) | | | |

*Primary Examiner* — Nicole T Verley
(74) *Attorney, Agent, or Firm* — Birch, Stewart, Kolasch & Birch, LLP

(57) ABSTRACT

The present disclosure provides a structural member comprising an edge portion $T_1$ and an edge portion $T_2$ opposing the edge portion $T_1$ in plan view in height direction (Z axis direction); when an axis direction connecting the edge portion $T_1$ and the edge portion $T_2$ is regarded as an X axis direction, the structural member includes, along the X axis direction, a region A including the edge portion $T_1$, and a region B located on the edge portion $T_2$ side than the region A and including the edge portion $T_2$; in a cross-section perpendicular to the X axis direction, the region A includes a closed cross-section portion A whose outer rim shape is one closed cross-section A; and the region B includes a closed cross-section portion B satisfying a predetermined (i) or (ii).

11 Claims, 12 Drawing Sheets

(56) References Cited

U.S. PATENT DOCUMENTS

| | | |
|---|---|---|
| 6,591,576 B1 | 7/2003 | Lida et al. |
| 2008/0150249 A1 | 6/2008 | Murata |
| 2013/0205591 A1 | 8/2013 | Santini et al. |
| 2020/0094640 A1 * | 3/2020 | Mukainakano ........ B60G 7/001 |
| 2021/0001675 A1 | 1/2021 | Ito et al. |

FOREIGN PATENT DOCUMENTS

| | | | |
|---|---|---|---|
| JP | 2002200908 A * | 7/2002 | |
| JP | 2004-262453 A | 9/2004 | |
| JP | 3613702 B2 * | 1/2005 | |
| JP | 2007-153254 A | 6/2007 | |
| JP | 2010023713 A * | 2/2010 | |
| WO | WO-2021002425 A1 * | 1/2001 | |
| WO | WO-02074562 A2 * | 9/2002 | |
| WO | WO-2006056046 A2 * | 6/2006 | .............. B21D 5/08 |
| WO | WO-2019103152 A1 * | 5/2019 | |
| WO | WO 2020/010199 A1 | 1/2020 | |
| WO | WO 2020/040941 A1 | 2/2020 | |

* cited by examiner

FIG. 3A Closed cross-section A
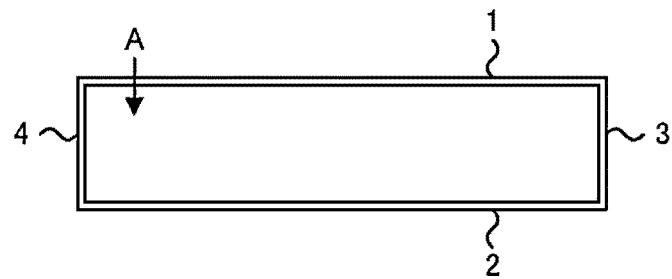
FIG. 3B Closed cross-section C
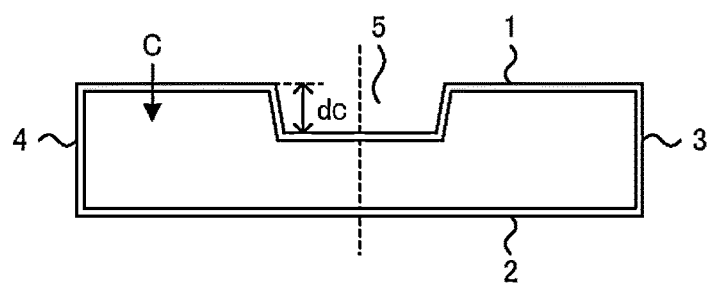
FIG. 3C Closed cross-section B
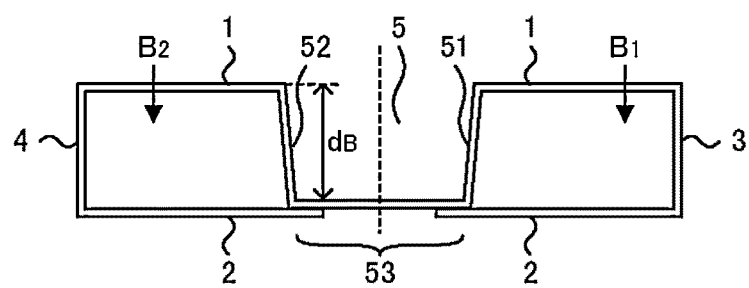
FIG. 4
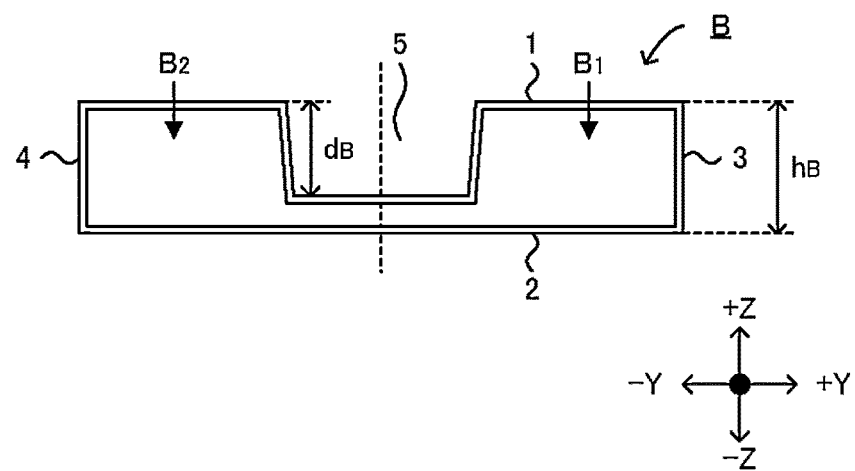

Closed cross-section A

STRUCTURAL MEMBER

TECHNICAL FIELD

The present disclosure relates to a structural member.

BACKGROUND ART

For example, a front lower arm, which is a suspension member of an automobile, is an L-shaped member and requires bending strength in the front and rear direction of the vehicle (see Patent Literature 1 for example). When a car tire drives over a curb or a step, a large load is applied to the tire in the front and rear direction (from front to rear) of the vehicle. This load is applied from the tire to the outer edge portion, in the car width direction, of the front lower arm, via the knuckle arm, etc., and acts as a bending force that bends this outer edge portion toward the inner edge portion side. When the above bending force is large due to the load being large, the outer edge portion is plastically deformed toward the inner edge portion side. When this plastic deformation occurs, the alignment of the tires will change, affecting the ride quality or handling ease of the vehicle. Also, a larger bending force may cause buckling of the front lower arm. When such buckling occurs, the alignment of the tires is greatly misaligned, making it impossible for the car to run, and the car cannot be brought to a repair shop by self-driving.

CITATION LIST

Patent Literature

Patent literature 1: WO 2019/103152

SUMMARY OF DISCLOSURE

Technical Problem

To increase the deformation strength of the front lower arm, it is necessary to increase the second moment of area, with respect to the bending force, of the front lower arm. For this reason, conventional designs have been devised to enlarge the width of each portion of the front lower arm and to give a predetermined shape to the edge portion of the member.

Meanwhile, with the background of global environmental problems, it is necessary to make automobiles lighter in order to reduce $CO_2$ emissions. In recent years, the front lower arm has especially been made thinner and thinner in order to reduce weight. Due to the thinning of the front lower arm, when the front lower arm is bent and deformed in the front and rear direction of the vehicle, out-of-plane deformation (deformation in the direction of vehicle height) tends to occur, and the originally designed cross-sectional shape may be lost. When the cross-sectional shape collapses, it becomes difficult to obtain high bending strength. Similar challenges exist not only for components applied to automobiles, but also for structural members used in other structures such as mobile objects or buildings.

The present disclosure has been made in view of the above circumstances, and a main object of the present disclosure is to provide a structural member with a good balance between bending strength and lightweight property.

Solution to Problem

[1]
A structural member comprising an edge portion $T_1$ and an edge portion $T_2$ opposing the edge portion $T_1$ in plan view in height direction (Z axis direction);
  when an axis direction connecting the edge portion $T_1$ and the edge portion $T_2$ is regarded as an X axis direction, the structural member includes, along the X axis direction, a region A including the edge portion $T_1$, and a region B located on the edge portion $T_2$ side than the region A and including the edge portion $T_2$;
  in a cross-section perpendicular to the X axis direction, the region A includes a closed cross-section portion A whose outer rim shape is one closed cross-section A; and
  the region B includes a closed cross-section portion B satisfying the following (i) or (ii):
    (i) in a cross-section perpendicular to the X axis direction, the closed cross-section portion B includes a closed cross-section $B_1$ and a closed cross-section $B_2$ those are connected via a bottom portion constituting a concave portion, and are placed apart from each other, or
    (ii) in a cross-section perpendicular to the X axis direction, the closed cross-section portion B incudes an open cross-section $B_1$ and an open cross-section $B_2$ those are formed by dividing one closed cross-section B with a concave portion, and in the closed cross-section B, a depth of the concave portion in the Z axis direction is 50% or more with respect to a maximum length of the closed cross-section B in the Z axis direction.

[2]
The structural member according to [1], wherein the closed cross-section portion B satisfies the (i).

[3]
The structural member according to [1], wherein the closed cross-section portion B satisfies the (ii).

[4]
The structural member according to any one of [1] to [3], wherein, along a direction (+X direction) from the edge portion $T_1$ to the edge portion $T_2$, a shape of a closed cross-section portion, in a cross-section perpendicular to the X axis direction of the structural member, is formed so as to be varied continuously from the closed cross-section portion A to the closed cross-section portion B.

[5]
The structural member according to any one of [1] to [4], wherein, in plan view in the height direction (Z axis direction), when an axis direction orthogonal to the X axis direction is regarded as an Y axis direction, and a length of the structural member in the Y axis direction is regarded as $L_{SY}$, the structural member has a curved shape in which the $L_{SY}$ is enlarged along a direction (+X direction) from the edge portion $T_1$ to the edge portion $T_2$; and
  the closed cross-section $B_1$ is placed along an inner rim portion of the curved shape, and the closed cross-section $B_2$ is placed along an outer rim portion of the curved shape.

[6]
The structural member according to any one of [1] to [5], wherein, in plan view in the height direction (Z axis direction), when an axis direction orthogonal to the X axis direction is regarded as an Y axis direction, an arbitrary axis parallel to the X axis direction and crosses the edge portion $T_2$ is regarded as an $X_1$ axis, a length of the region A in the $X_1$ axis is regarded as $L_{AX}$, and a length of the region A in the Y axis direction at an arbitrary point $P_A$ on the $X_1$ axis in the region A is regarded as $L_{AY}$, $L_{AX}/L_{AY}$ satisfies 1.0 or more and 4.0 or less at least at any one of the point $P_A$.

[7]

The structural member according to any one of [1] to [6], wherein the closed cross-section portion B is constituted with one member.

[8]

The structural member according to any one of [1] to [6], wherein the closed cross-section portion B is constituted with two or more members.

[9]

The structural member according to any one of [1] to [8], wherein the structural member is a structural member of an automobile.

[10]

The structural member according to any one of [1] to [9], wherein the structural member is a front lower arm.

[11]

The structural member according to any one of [1] to [10], wherein at least a steel plate is used as a material constituting the structural member, and a tensile strength of the steel plate is 780 MPa or more.

Advantageous Effects of Disclosure

The structural member in the present disclosure has an effect that the structural member has a good balance between bending strength and lightweight property.

BRIEF DESCRIPTION OF DRAWINGS

FIGS. 3A to 3C are schematic cross-sectional views of the structural member shown in FIG. 2.

FIG. 4 is a schematic cross-sectional view illustrating an example of the closed cross-section portion B in the present disclosure.

DESCRIPTION OF EMBODIMENTS

The structural member in the present disclosure will be hereinafter described in detail. Each figure shown below exaggerates the size and shape of each part appropriately for ease of understanding. Also, in each figure, the hatching or sign may be omitted for convenience.

Figure 1:
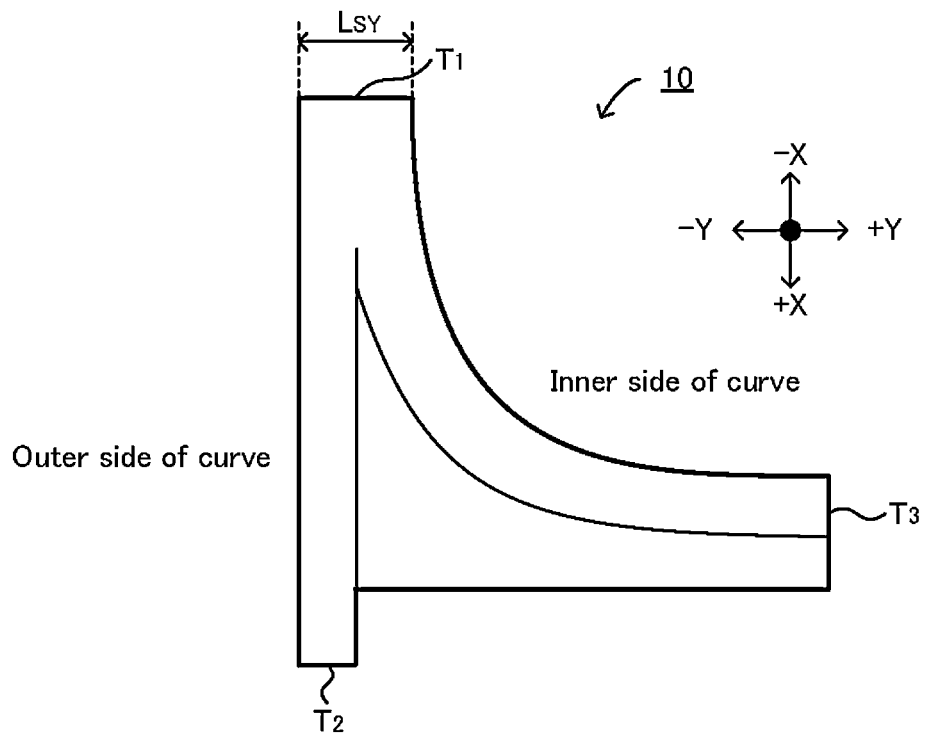
FIG. 1 is a schematic plan view illustrating an example of the structural member in the present disclosure.

FIG. 1 is a schematic plan view illustrating an example of the structural member in the present disclosure, and specifically illustrating an example of a front lower arm. A structural member 10, shown in FIG. 1, is a member configured to connect the lower part of the knuckle (not shown in the figure), which rotatably supports the wheel on which the tire is installed, to the car body. An edge portion $T_1$ on one end of the structural member 10 indicates the installation position of the ball joint which is attached to the knuckle. Also, an edge portion $T_2$ opposing the edge portion $T_1$ in the X axis direction, and an edge portion $T_3$ located on the +Y direction than the edge portion $T_2$, indicate the connection points with the body members such as the subframe (not shown in the figure). The structural member 10 is secured to the body member via a bush joint (not shown in the figure), for example, provided at the edge portion $T_2$ and edge portion $T_3$.

Also, as shown in FIG. 1, the structural member 10 is an L-shaped member. Specifically, when the length of structural member 10 in the Y axis direction is regarded as $L_{SY}$, the structural member 10 has a curved shape in which the $L_{SY}$ is enlarged along the +X direction. In the structural member 10, the side of the curved shape with a large radius of curvature may be referred to as an outer side of the curvature, and the side of the curved shape with a small radius of curvature may be referred to as an inner side of the curvature.

Figure 2:
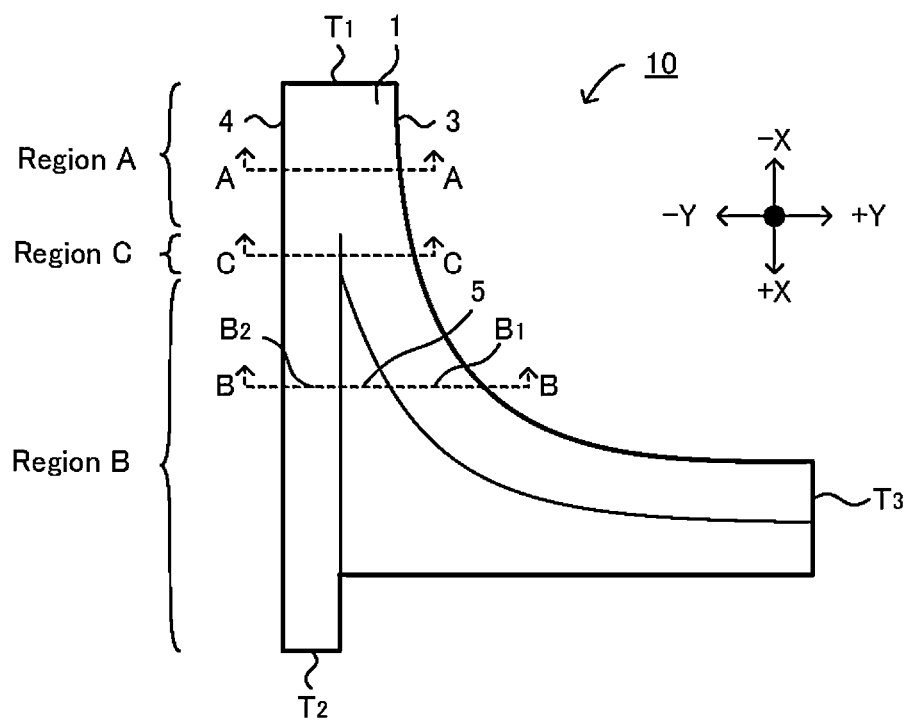
FIG. 2 is a schematic plan view illustrating an example of the structural member in the present disclosure.

FIG. 2 is a schematic plan view illustrating an example of the structural member in the present disclosure, and FIGS. 3A to 3C are schematic cross-sectional views of the structural member shown in FIG. 2. Specifically, FIG. 3A is the A-A cross-sectional view of FIG. 2, FIG. 3B is the C-C cross-sectional view of FIG. 2, and FIG. 3C is the B-B cross-sectional view of FIG. 2.

The structural member 10 shown in FIG. 2 includes the edge portion $T_1$ and the edge portion $T_2$ opposing the edge portion $T_1$. Also, when an axis direction connecting the edge portion $T_1$ and the edge portion $T_2$ is regarded as an X axis direction, the structural member 10 includes, along the X axis direction, a region A including the edge portion $T_1$, and a region B located on the edge portion $T_2$ side than the region A and including the edge portion $T_2$. Also, region C, which is an intermediate region between the region A and the region B, may be located therebetween.

As shown in FIG. 3A, in the cross-section perpendicular to the X axis direction, the region A shown in FIG. 2 includes a closed cross-section portion A whose outer rim shape is one closed cross-section A. The closed cross-section A shown in FIG. 3A includes the top surface portion 1, the bottom surface portion 2, the first wall portion 3 and the second wall portion 4. In the present disclosure, the term "closed cross-section" means a shape whose outer rim shape in the cross-section is closed (that is, the outer rim is endless, and there is no edge portion in the circumferential direction of the cross-sectional shape), and the term "closed cross-section portion" means a portion including a closed cross-section. Also, In FIG. 3A, the bottom surface portion 2 opposes the top surface portion 1, the first wall section 3 connects the top surface portion 1 and the bottom surface portion 2, the second wall portion 4 opposes the first wall portion 3, and connects the top surface portion 1 and the bottom surface portion 2.

As shown in FIG. 3C, in the cross-section perpendicular to the X axis direction, the region B shown in FIG. 2 includes a closed cross-section portion B including a closed cross-section $B_1$ and a closed cross-section $B_2$ those are connected via a bottom portion 53 constituting a concave portion 5, and are placed apart from each other. In FIG. 3C, the closed cross-section $B_1$ includes the top surface portion 1, the bottom surface portion 2, the first wall portion 3, and the wall portion 51 of the concave portion 5; and the closed cross-section $B_2$ includes the top surface portion 1, the bottom surface portion 2, the second wall portion 4, and the wall portion 52 of the concave portion 5. Meanwhile, as shown in FIG. 4, the region B may include a closed cross-section portion B including an open cross-section $B_1$ and an open cross-section $B_2$ those are formed by dividing one closed cross-section B with the concave portion 5. That is, the closed cross-section $B_1$ may be replaced by the open cross-section $B_1$, and the closed cross-section $B_2$ may be replaced by the open cross-section $B_2$. In the present disclosure, the term "open cross-section" means a shape whose outer rim shape in the cross-section is open (that is, the outer rim is an ended shape, and there is an edge portion in the circumferential direction of the cross-sectional shape). Also, the depth $d_B$ in the Z axis direction of the concave portion 5 in the closed cross-section B may be 50% or more, may be 70% or more, may be 80% or more, and may be 90% or more, with respect to the maximum length $h_B$ of the closed cross-section B in the Z axis direction.

As shown in FIG. 3B, the region C shown in FIG. 2 includes a closed cross-section portion C including a closed cross-section C. The shape of closed cross-section C is varied continuously from the closed cross-section A to the closed cross-section $B_1$ and the closed cross-section $B_2$ along the +X direction. The closed cross-section C shown in FIG. 3B includes the top surface portion 1 with the concave portion 5 formed thereon, the bottom surface portion 2, the first wall portion 3, and the second wall portion 4.

Here, as shown in FIG. 2, the closed cross-section $B_1$ is placed along the inner rim portion of the curved shape, and the closed cross-section $B_2$ is placed along the outer rim portion of the curved shape. Therefore, the closed cross-section portion of the structural member 10 shown in FIG. 2 branches from the closed cross-section A to the closed cross-section $B_1$ and the closed cross-section $B_2$ along the +X direction. Since the material is placed at a far place from the neutral axis of bending in the closed cross-section portion B in FIG. 2, the second moment of area of the structural member 10 may be increased.

According to the present disclosure, since the closed cross-section portion A and the closed cross-section portion B are included as the closed cross-section portion perpendicular to the X axis, a structural member with a good balance between bending strength and lightweight property may be obtained. Here, when a load in the +Y direction is applied to the center of the member (such as a ball joint) installed to the edge portion $T_1$ shown in FIG. 2, bending force that displaces the center position thereof toward the edge portion $T_3$ side is applied, and the first wall portion 3 is subjected to a compressive load. The closed cross-section portion in the present disclosure functions as a force-resistant portion that suppresses the out-of-plane deformation of the first wall portion 3 due to this compressive load. In particular, in the present disclosure, it is possible to suppress the shape collapse of the closed cross-section portion B by placing the closed cross-section portion B, with good bending strength, in the region B which is relatively strongly affected by the compressive load. Also, while the bending strength of closed cross-section portion B is better than that of closed cross-section portion A, it is disadvantageous in terms of lightweight property. Therefore, it is possible to improve the lightweight property by placing the closed cross-section portion A in the region A which is relatively not affected by the compressive load. Thereby, a structural member with a good balance between bending strength and lightweight property may be obtained.

1. Region A

Figure 5:
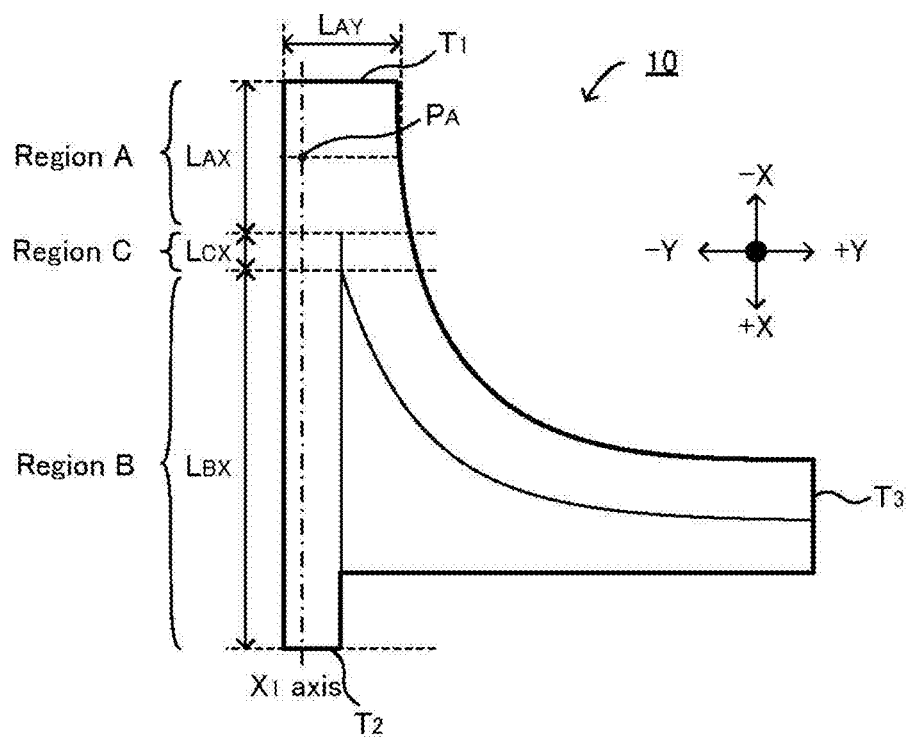
FIG. 5 is a schematic plan view illustrating an example of the structural member in the present disclosure.

Region A in the present disclosure is a region including the edge portion $T_1$, as shown in FIG. 5. Also, the region A includes a closed cross-section portion A at the boundary between the region A and another adjacent region (such as region B, region C or region D).

As shown in FIG. 5, an arbitrary axis parallel to the X axis direction and crosses the edge portion $T_2$ is regarded as an $X_1$ axis, a length of the region A in the $X_1$ axis is regarded as $L_{AX}$, and a length of the region A in the Y axis direction at an arbitrary point $P_A$ on the $X_1$ axis in the region A is regarded as $L_{AY}$. The $X_1$ axis may be the axis which crosses the branch point described below. Also, the arbitrary point $P_A$ may be the intersection point of the $X_1$ axis and the edge portion $T_1$. The ratio ($L_{AX}/L_{AY}$) of $L_{AX}$ with respect to $L_{AY}$ satisfies, for example, 0.5 or more, may satisfy 1.0 or more, and may satisfy 1.5 or more, on at least any one of the point $P_A$. When the $L_{AX}/L_{AY}$ is too low, it is possible that the lightweight property improving effect due to the region A is reduced. Meanwhile, $L_{AX}/L_{AY}$ satisfies, for example, 4.0 or less, may satisfy 3.5 or less, and may satisfy 3.0 or less, on at least any one of the point $P_A$. When the $L_{AX}/L_{AY}$ is too high, it is possible that the bending strength improving effect due to the region B is reduced.

Also, as shown in FIG. 5, a length of the region A in the $X_1$ axis is regarded as $L_{AX}$, and a length of the region B in the $X_1$ axis is regarded as $L_{BX}$, and a length of the region C in the $X_1$ axis is regarded as $L_{CX}$. The ratio ($L_{AX}/L_{TX}$) of $L_{AX}$ with respect to the sum ($L_{TX}$) of $L_{BX}$ and $L_{CX}$, for example, is 0.10 or more, and may be 0.30 or more. When the $L_{AX}/L_{TX}$ is too low, it is possible that the lightweight property improving effect due to the region A is reduced. Meanwhile, $L_{AX}/L_{TX}$, for example, is 1.87 or less, and may be 0.95 or less. When the $L_{AX}/L_{TX}$ is too high, it is possible that the bending strength improving effect due to the region B is reduced. Also, the distance from the edge portion $T_1$ to the edge portion $T_2$ in the $X_1$ axis, for example, is 300 mm or more, and 600 mm or less.

In the cross-section perpendicular to the X axis direction, the region A includes a closed cross-section portion A whose outer rim shape is one closed cross-section A. That is, the closed cross-section portion A includes only one closed cross-section A as a closed cross-section identified from its outer rim. Incidentally, the closed cross-section is defined by the shape of the outer rim as described above. Therefore, even if the closed cross-section is divided into several regions within thereof by the installation of a partition wall and so on inside one closed cross-section, the closed cross-section is regarded as one closed cross-section. Meanwhile, for example, the structural member 10 shown in FIGS. 19A and 19B below includes a closed cross-section portion whose outer rim shape includes two closed cross-sections on the edge portion $T_1$ side. Such a closed cross-section portion does not correspond to the closed cross-section portion A in the present disclosure. Also, the closed cross-section A is a closed cross-section wherein a predetermined concave portion is not provided. The term "predetermined concave portion" means a concave portion whose depth of the concave portion in the closed cross-section A, in the Z axis direction, is 50% or more with respect to the maximum length of the closed cross-section A in the Z axis direction.

Figure 6:
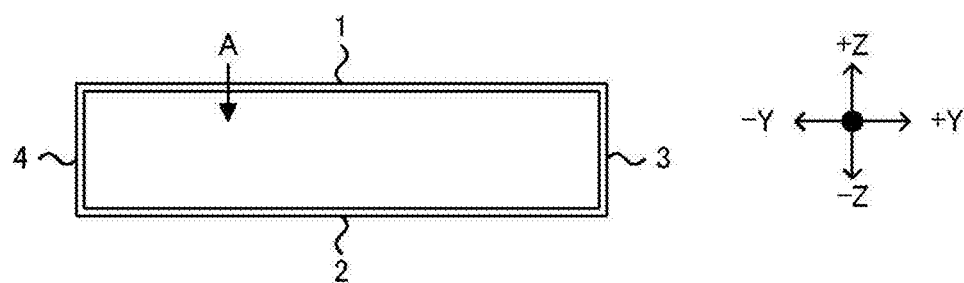
FIG. 6 is a schematic cross-sectional view illustrating an example of the closed cross-section portion A in the present disclosure.
Figure 7A:
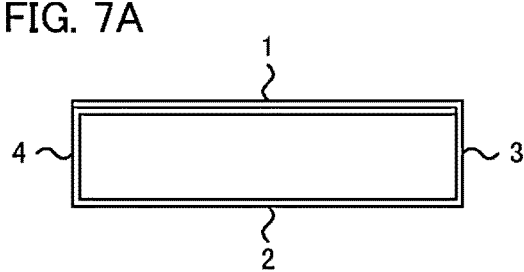
FIGS. 7A to 7D are schematic cross-sectional views illustrating an example of the closed cross-section portion A in the present disclosure.
Figure 7C:
Figure 7B:
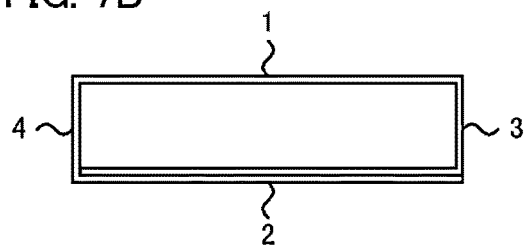
Figure 7D:
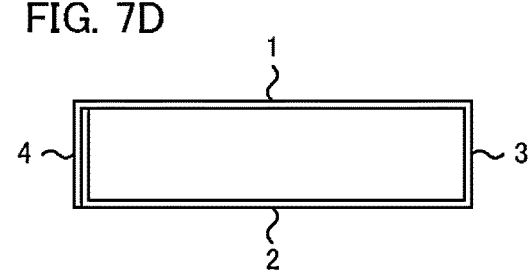

The shape of the outer rim of the closed cross-section A is not particularly limited, and examples thereof may include a polygon such as a rectangle; and a round shape such as an exact circle and an oval shape. Incidentally, the polygon in the present disclosure includes not only a strict polygon, but also a shape in which the part corresponding to the corner of the polygon is formed into an arc shape. The closed cross-section A shown in FIG. 6 includes the top surface portion 1, the bottom surface portion 2, the first wall portion 3 and the second wall portion 4. Incidentally, in FIG. 6, although each side of the closed cross-section is shown as a straight line, each side of the closed cross-section in the present disclosure is not limited to a straight line, and may be a curve. In the X axis direction, the region A preferably includes many regions wherein the closed cross-section portion A is formed, and may include the closed cross-section portions A throughout the X axis direction.

The closed cross-section portion A may be constituted with one member. Such a structural member is obtained, for example, by carrying out a pressing process on one sheet of metal and carrying out a fixing process to form a closed cross-section. Examples of the fixing process may include, a method wherein sheets of metal are subjected to a fixing process. More specific examples of the fixing process may include welding such as spot welding, laser welding, and arc welding; mechanical joints such as riveting, crimped joints, and bolted joints; and adhesion with an adhesive. A fixed portion is formed by the fixing process.

Also, the closed cross-section portion A may be constituted with two or more members. Such a structural member is obtained, for example, by carrying out a pressing process on two or more sheets of metal to join the different sheets of metal, and carrying out a fixing process to form a closed cross-section. The fixing process is similar to those described above.

Each of the closed cross-section portions A shown in FIGS. 7A to 7D are closed cross-section portions constituted with one member. In the closed cross-section portion A shown in FIG. 7A, a fixed portion is formed in the top surface portion 1, and in the closed cross-section portion A shown in FIG. 7B, a fixed portion is formed in the bottom surface portion 2, in the closed cross-section portion A shown in FIG. 7C, a fixed portion is formed in the first wall portion 3, and in the closed cross-section portion A shown in FIG. 7D, a fixed portion is formed in the second wall portion 4. Incidentally, in FIGS. 7A to 7D, although the fixed portions are formed throughout the top surface portion, bottom surface portion, first wall portion or second wall portion, the fixed portion may be formed in at least a part thereof. Also, in FIGS. 8A to 11B described later, although the fixed portion is formed at the place where the members are placed so as to overlap each other, the description of the fixed portion is omitted.

Figure 8A:
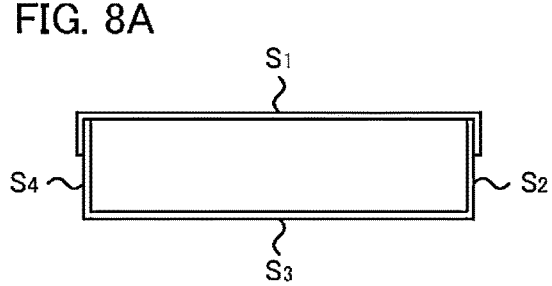
FIGS. 8A to 8F are schematic cross-sectional views illustrating an example of the closed cross-section portion A in the present disclosure.
Figure 8D:
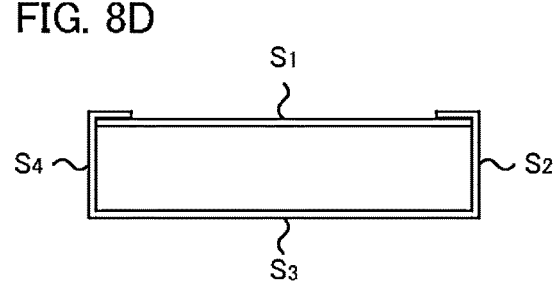
Figure 8B:
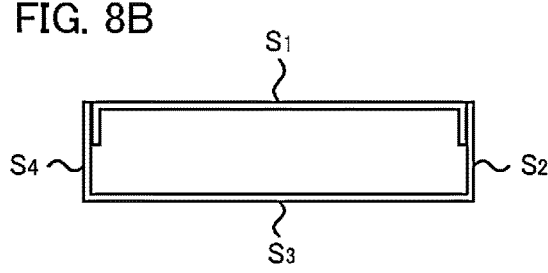
Figure 8E:
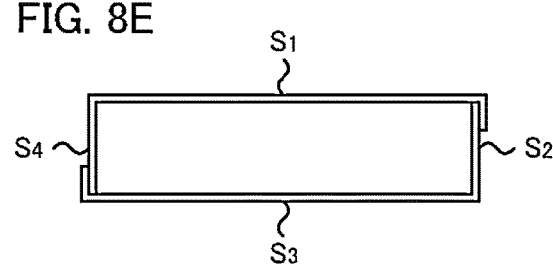
Figure 8C:
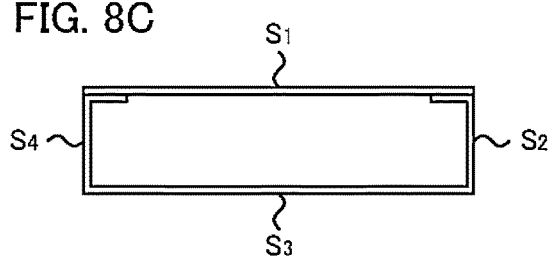
Figure 8F:
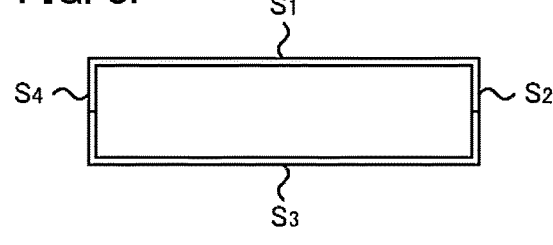
Figure 9A:
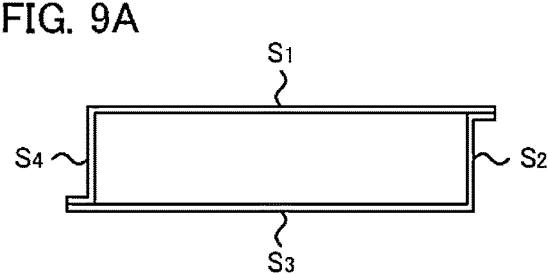
FIGS. 9A to 9E are schematic cross-sectional views illustrating an example of the closed cross-section portion A in the present disclosure.
Figure 9B:
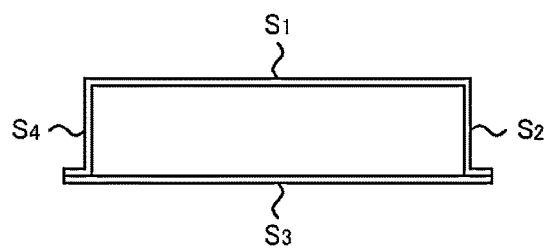
Figure 9C:
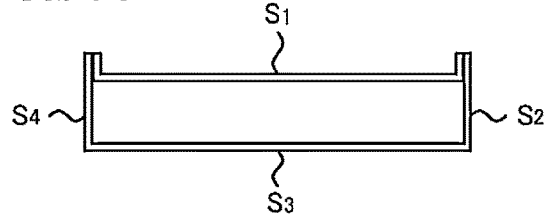
Figure 9D:
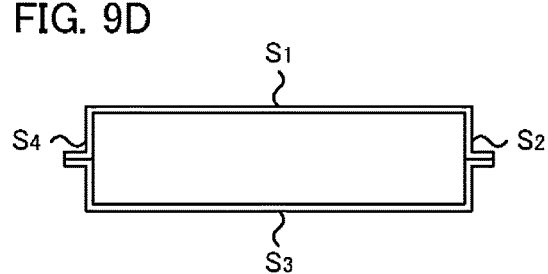
Figure 9E:
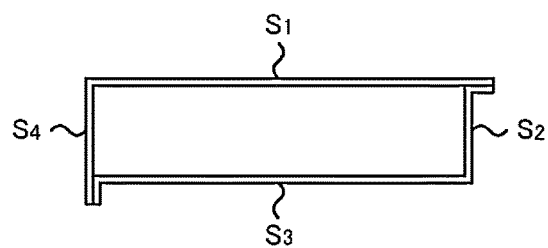

Each of the closed cross-section portions A shown in FIGS. 8A to 8F are closed cross-section portions constituted with two members. FIGS. 8A to 8F show a joining method wherein two members are joined together on the outer rime line at the fixed portions. Also, in FIGS. 8A to 8F, $S_1$ to $S_4$ correspond to any one of the top surface portion, bottom surface portion, first wall portion, or second wall portion, respectively. For example, when $S_1$ is the top surface portion, then $S_3$ corresponds to the bottom surface portion, one of $S_2$ and $S_4$ corresponds to the first wall portion, and the other corresponds to the second wall portion. Also, in FIGS. 8A to 8F, although $S_1$ and $S_3$ are indicated longer than $S_2$ and $S_4$ for convenience, $S_1$ and $S_3$ may be shorter and may be the same as $S_2$ and $S_4$. The same is true for $S_1$ to $S_4$ in FIGS. 9A to 11B described below. In the closed cross-section portions A shown in FIGS. 8A to 8D, a member constituting $S_1$ and a member constituting $S_2$, $S_3$ and $S_4$ are used. As shown in FIGS. 8A and 8C, the member constituting $S_1$ may be placed and joined so as to cover the member constituting $S_2$, $S_3$ and $S_4$, and as shown in FIGS. 8B and 8D, the member constituting $S_2$, $S_3$ and $S_4$ may be placed and joined so as to cover the member constituting $S_1$. In FIGS. 8A and 8C, there are two fixed portions fixing the member constituting $S_1$ and the member constituting $S_2$, $S_3$ and $S_4$, and in both of the two fixed portions, the members are uniformed so that the member constituting $S_1$ is placed on the outer side than the member constituting $S_2$, $S_3$ and $S_4$. Meanwhile, in FIGS. 8B and 8D, there are two fixed portions fixing the member constituting $S_1$ and the member constituting $S_2$, $S_3$ and $S_4$, and in both of the two fixed portions, the members are uniformed so that the member constituting $S_1$ is placed on the inner side than the member constituting $S_2$, $S_3$ and $S_4$. Also, as shown in FIGS. 8A and 8B, a fixed portion may be formed in $S_2$ and $S_4$, and as shown in FIGS. 8C and 8D, a fixed portion may be formed in $S_1$. Also, in the closed cross-section portion A shown in FIG. 8E, a member constituting $S_1$ and $S_4$ and a member constituting $S_2$ and $S_3$ are used. In FIG. 8E, the member constituting $S_1$ and $S_4$ are placed on the outer side than the member constituting $S_2$ and $S_3$ in the fixed portion in the $S_2$ side, and the member constituting $S_1$ and $S_4$ are placed on the inner side than the member constituting $S_2$ and $S_3$ in the fixed portion in the $S_4$ side, and are not uniformed. In this way, when there are multiple fixed portions, the member placed on the inner side and the member placed on the outer side may or may not be uniformed. Also, in the closed cross-section portion A shown in FIG. 8F, a member constituting $S_1$ $S_2$ and $S_4$ and a member constituting $S_2$ $S_3$ and $S_4$ are used, and $S_2$ and $S_4$ are formed with two members, respectively. As shown in FIG. 8F, the fixed portion may be formed by jostling the members (joining the end surfaces of the members together), not by overlaying the members.

Similar to FIGS. 8A to 8F, each of the closed cross-section portions A shown in FIGS. 9A to 9E are also closed cross-section portions constituted with two members. FIGS. 9A to 9E show a joining method wherein at least one of the two members includes a flange portion at the fixed portion. In the closed cross-section portion A shown in FIG. 9A, a member constituting $S_1$ and $S_4$ and a member constituting $S_2$ and $S_3$ are used, and $S_2$ and $S_4$ respectively include a flange portion. In the closed cross-section portion A shown in FIG. 9B, a member constituting $S_1$ $S_2$ and $S_4$ and a member constituting $S_3$ are used, and $S_2$ and $S_4$ respectively include a flange portion. In the closed cross-section portion A shown in FIG. 9C, a member constituting $S_1$ and a member constituting $S_2$, $S_3$ and $S_4$ are used, and $S_1$ includes two flange portions. In the closed cross-section portion A shown in FIG. 9D, a member constituting $S_1$ $S_2$ and $S_4$ and a member constituting $S_2$ $S_3$ and $S_4$ are used, and $S_2$ and $S_4$ in each member respectively include a flange portion. In the closed cross-section portion A shown in FIG. 9E, a member constituting $S_1$ and $S_4$ and a member constituting $S_2$ and $S_3$ are used, and $S_2$ and $S_3$ respectively include a flange portion. As shown in FIGS. 9A to 9E, the site where the flange portion is formed is not particularly limited. Also, when multiple fixed portions are provided, for example, the joining method shown in FIGS. 8A to 8F and the joining method shown in FIGS. 9A to 9E may be combined.

Figure 10A:
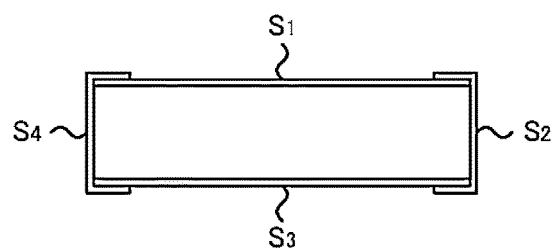
FIGS. 10A to 10B are schematic cross-sectional views illustrating an example of the closed cross-section portion A in the present disclosure.
Figure 10B:
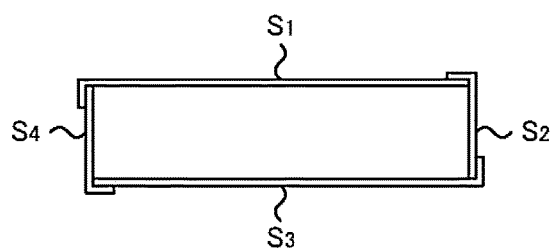
Figure 11A:
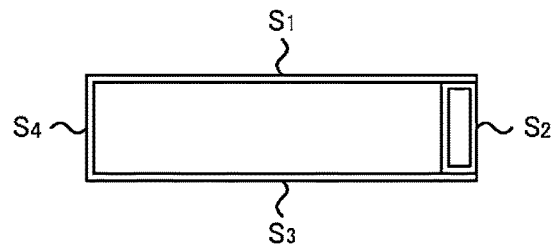
FIGS. 11A to 11B are schematic cross-sectional views illustrating an example of the closed cross-section portion A in the present disclosure.
Figure 11B:
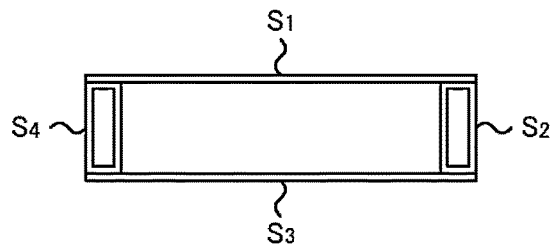

Each of the closed cross-section portions A shown in FIGS. 10A to 10B are closed cross-section portions constituted with four members. In the closed cross-section portion A shown in FIGS. 10A to 10B, members constituting $S_1$ to $S_4$ respectively are used. In FIG. 10A, the member constituting $S_2$ is placed and joined so as to cover the member constituting $S_1$ and the member constituting $S_4$. This joining method is similar to the joining method of the members constituting $S_1$ in FIG. 8A. The joining method of each member is not limited to the joining method shown in FIG. 8A; the joining method shown in FIGS. 8B to 8F may be adopted, or the joining method using a flange portion as shown in FIGS. 9A to 9E may be adopted. Also, the joining method of each member may be the same and may be different from each other.

In the present disclosure, the member constituting the side of the closed cross-section A may include a closed cross-sectional structure. Specifically, in the closed cross-section portion A shown in FIG. 11A, $S_2$ (for example, the first wall portion) includes a closed cross-sectional structure. Also, multiple members constituting the side of the closed cross-section A may include a closed cross-sectional structure. Specifically, in the closed cross-section portion A shown in FIG. 11B, $S_2$ and $S_4$ (for example, the first wall portion and the second wall portion) respectively include a closed cross-sectional structure. The inside of the closed cross-sectional structure may be hollow, and may be filled with fillers such as resin.

2. Region B

As shown in FIG. 5, the region B in the present disclosure is a region located on the edge portion $T_2$ side than the region A and including the edge portion $T_2$. Specifically, the region B is a region on the +X direction side than the boundary between the region B and other adjacent regions (such as region A, region C or region D). Also, the region B includes a closed cross-section portion B at the boundary between the region B and other adjacent regions. Also, the region B includes a closed cross-section portion B satisfying the following (i) or (ii).

In the cross-section perpendicular to the X axis direction, the closed cross-section portion B satisfying the (i) includes a closed cross-section $B_1$ and a closed cross-section $B_2$ those are connected via a bottom portion constituting a concave portion, and are placed apart from each other. Also, as a closed cross-section defined by the outer rim thereof, the closed cross-section portion B satisfying the (i) includes a closed cross-section $B_1$ and a closed cross-section $B_2$. The shape of the outer rim of the closed cross-section $B_1$ and the closed cross-section $B_2$ is not particularly limited, and examples thereof may respectively include a polygon such as a rectangle; and a round shape such as an exact circle and an oval shape.

Figure 12A:
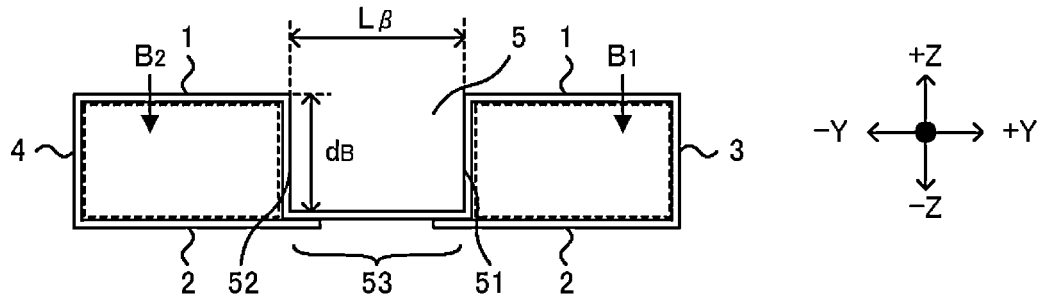
FIGS. 12A to 12B are schematic cross-sectional views illustrating an example of the closed cross-section portion B in the present disclosure.
Figure 12B:
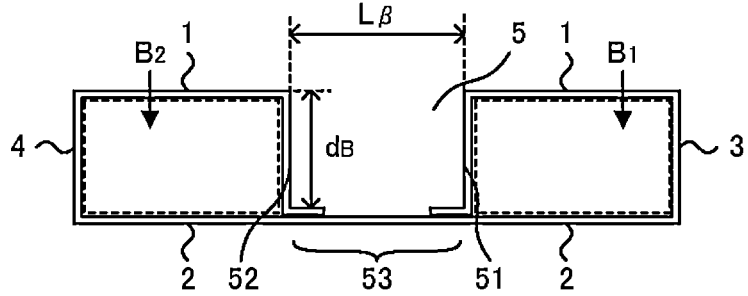

The closed cross-section portion B shown in FIG. 12A includes a closed cross-section $B_1$ and a closed cross-section $B_2$ those are connected via a bottom portion 53 constituting the concave portion 5, and are placed apart from each other. The closed cross-section $B_1$ includes the top surface portion 1, the bottom surface portion 2, the first wall portion 3 and the wall portion 51 of the concave portion 5; and the closed cross-section $B_2$ includes the top surface portion 1, the bottom surface portion 2, the second wall portion 4, and the wall portion 52 of the concave portion 5. Also, the length $L_B$ of the concave portion 5 in the Y axis direction is preferably enlarged along the +X direction (the direction from the back side of the paper toward the front side in FIG. 12A). That is, the distance between the closed cross-section $B_1$ and the closed cross-section $B_2$ preferably increases along the +X direction. Specifically, as shown in FIG. 2, it is preferable that the closed cross-section $B_1$ is placed along an inner rim portion of the curve, the closed cross-section $B_2$ is placed along an outer rim portion of the curve, and the closed cross-section $B_1$ and closed cross-section $B_2$ are further separated from each other along the +X direction. Also, as shown in FIG. 12A, the bottom portion 53 of the concave portion 5 may be placed on the bottom surface portion 2 side (in the −Z direction) position, in the cross-section perpendicular to the X axis direction, with respect to the top surface portion 1. Meanwhile, although not particularly shown in the figures, the bottom portion of the concave portion may be placed on the top surface portion side (in the +Z direction) position, in the cross-section perpendicular to the X axis direction, with respect to the bottom surface portion. Also, in FIG. 12A, the bottom portion 53 of the concave portion 5 includes a site formed continuously from the wall portion 51 and the wall portion 52. At this bottom portion 53, the bottom surface portion 2 is formed discontinuously. Meanwhile, in FIG. 12B, the bottom portion 53 of the concave portion 5 includes a site formed continuously from the bottom surface portion 2. At this bottom portion 53, there is a discontinuity between the site that is continuously formed from the wall portion 51 and the site that is continuously formed from the wall portion 52.

Figure 13A:
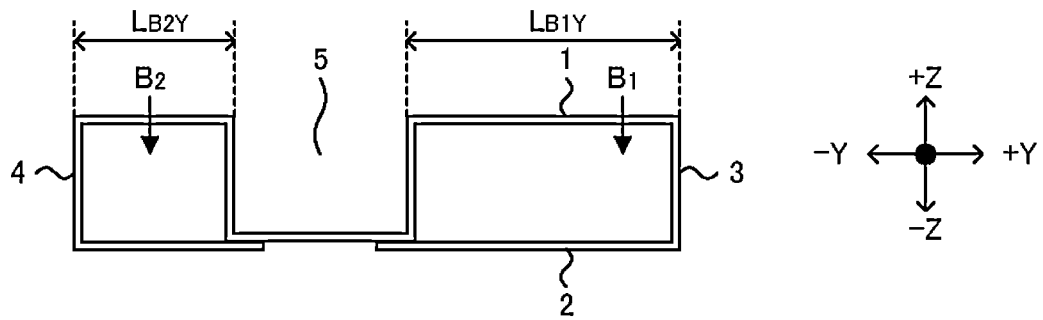
FIGS. 13A to 13B are schematic cross-sectional views illustrating an example of the closed cross-section portion B in the present disclosure.
Figure 13B:
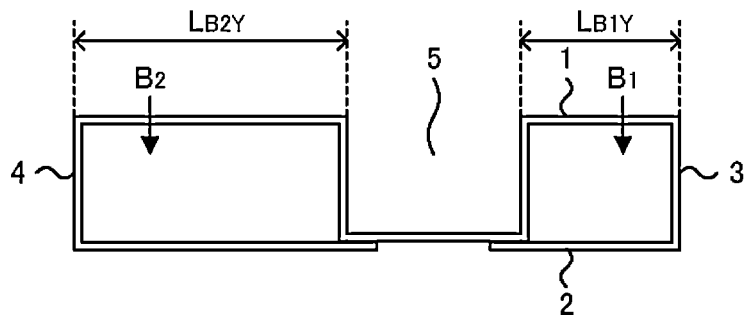

Also, the length $L_{B1Y}$ of the closed cross-section $B_1$ in the Y axis direction and the length $L_{B2Y}$ of the closed cross-section $B_2$ in the Y axis direction may be the same, and may be different. For example, in FIG. 13A, $L_{B1Y}$ is larger than $L_{B2Y}$. In an opposite manner, in FIG. 13B, $L_{B2Y}$ is larger than $L_{B1Y}$.

Figure 14A:
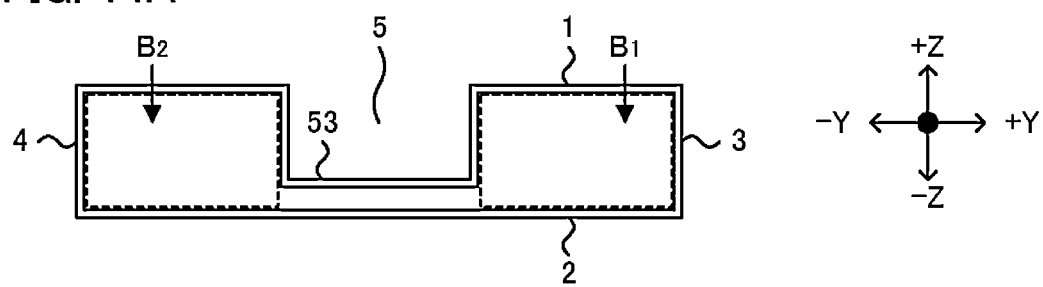
FIGS. 14A to 14B are schematic cross-sectional views illustrating an example of the closed cross-section portion B in the present disclosure.
Figure 14B:
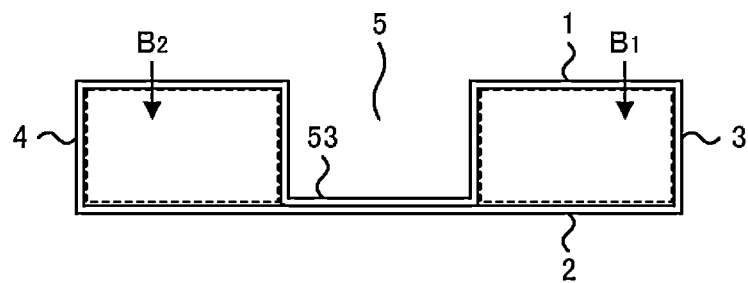

Meanwhile, in the cross-section perpendicular to the X axis direction, the closed cross-section portion B satisfying the (ii) includes an open cross-section $B_1$ and an open cross-section $B_2$ those are formed by dividing one closed cross-section B with the concave portion. For example, the closed cross-section portion B shown in FIG. 14A includes an open cross-section $B_1$ and an open cross-section $B_2$ those are formed by dividing one closed cross-section B with the concave portion 5. Also, as shown in FIG. 4 described above, the depth $d_B$ of the concave portion 5 in the closed cross-section B, in the Z axis direction, may be 50% or more, may be 70% or more, may be 80% or more, and may be 90% or more, with respect to the maximum length $h_B$ of the closed cross-section B in the Z axis direction. When the closed cross-section B includes an open cross-section $B_1$ and an open cross-section $B_2$, there is no contact between the bottom portion 53 of the concave portion 5 and the bottom surface portion 2, as shown in FIG. 14A. Also, as shown in FIGS. 14A and 14B, the bottom portion 53 of the concave portion 5 may be placed on the bottom surface portion 2 side (in the −Z direction) position, in the cross-section perpendicular to the X axis direction, with respect to the top surface portion 1. Meanwhile, although not particularly shown in the figures, the bottom portion of the concave portion may be placed on the top surface portion side (in the +Z direction) position, in the cross-section perpendicular to the X axis direction, with respect to the bottom surface portion. Also, the depth $d_B$ may be approximately 100% with respect to the maximum length $h_B$. In this case, as shown in FIG. 14B, the bottom portion 53 of the concave portion 5 and the bottom surface portion 2 may be in contact. In this case, the closed cross-section portion B includes the closed cross-section $B_1$ and the closed cross-section $B_2$. Also, when the bottom portion 53 of the concave portion 5 and the bottom surface portion 2 is in contact, a fixed portion fixing these two may be formed.

The closed cross-section portion B may be constituted with one member, and may be constituted with two or more members. With the exception of the concave portion, these matters are similar to those described for the closed cross-section portion A described above.

3. Region C

As shown in FIG. 5, the structural member in the present disclosure may include a region C located between the region A and the region B, in the X axis direction. The region C is a region wherein, along a direction (+X direction) from the edge portion $T_1$ to the edge portion $T_2$, and the shape of the closed cross-section portion, in the cross-section perpendicular to the X axis direction of the structural member, varies continuously from the closed cross-section portion A to the closed cross-section portion B. That is, along the +X direction, the closed cross-section portion of the structural member is formed so as the cross-sectional shape varies continuously from the closed cross-section portion A to the closed cross-section portion B.

In the cross-section perpendicular to the X axis direction, the region C includes a closed cross-section portion C including a closed cross-section C. The closed cross-section portion C may include only one closed cross-section C as a closed cross-section identified from its outer rim. The shape of the closed cross-section C is not particularly limited, and with the exception of the concave portion, it is similar to those described for the closed cross-section A described above. The closed cross-section C shown in FIG. 3B includes the top surface portion 1 with the concave portion 5 formed thereon, the bottom surface portion 2, the first wall portion 3, and the second wall portion 4. Also, the depth of the concave portion 5 in the closed cross-section C is regarded as $d_C$. The region C includes a branch point (branch point of the closed cross-section) located at the boundary of the closed cross-section portion A and the closed cross-section portion C.

Figure 15A:
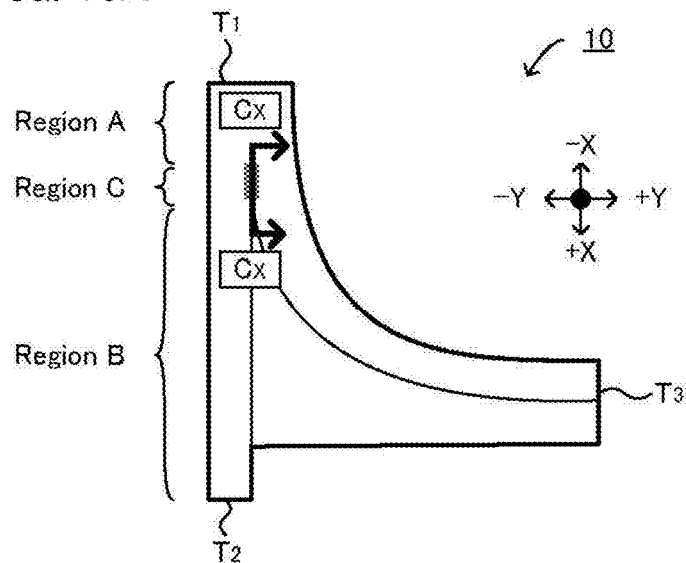
FIG. 15A is a schematic plan view and FIG. 15B is a cross-sectional view illustrating an example of the structural member in the present disclosure.
Figure 15B:
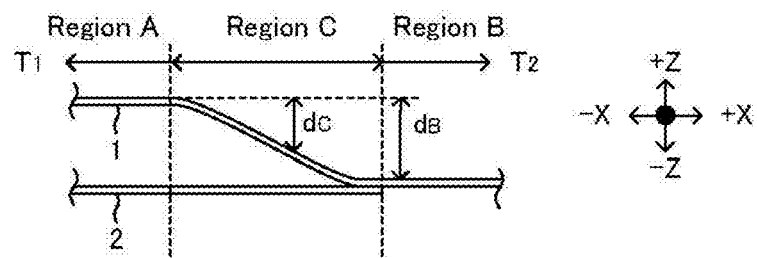

FIG. 15A is a schematic plan view illustrating an example of the structural member in the present disclosure, and FIG. 15B is a $C_X$-$C_X$ cross-sectional view of FIG. 15A. The $C_X$-$C_X$ axis is an axis parallel to the X axis direction and crosses the branch point located at the boundary of the closed cross-section portion A and the closed cross-section portion C. As shown in FIGS. 15A and 15B, the depth $d_C$ of the concave portion 5 in the region C (closed cross-section C) increases continuously along the +X direction (the direction from edge portion $T_1$ to the edge portion $T_2$). In FIG. 15B, the depth $d_C$ at the boundary between the region A and the region C is 0, the depth $d_C$ increases along the +X direction, and the depth $d_C$ at the boundary between the region B and the region C coincides with the depth $d_B$ (the depth of concave portion 5 in closed cross-section B). The boundary line between the region C and the region A is a line parallel to the Y axis direction which crosses the boundary portion on the $C_X$-$C_X$ axis, that is, the branch point. The boundary line between the region C and the region B is a line parallel to the Y axis direction which crosses the boundary portion on the $C_X$-$C_X$ axis.

Also, the region C includes the closed cross-section portion C all across the region from the boundary with the region A to the boundary with the region B, in the X axis direction. Also, the closed cross-section portion C may be constituted with one member, and may be constituted with two or more members. With the exception of the concave portion, these matters are similar to those described for the closed cross-section portion A described above.

Incidentally, the structural member in the present disclosure may not include the region C. In this case, the structural member is a structural member which is discontinuously varied from the closed cross-section A in the region A to the closed cross-section $B_1$ and the closed cross-section $B_2$ in the region B, along the direction from the edge portion $T_1$ to the edge portion $T_2$ (+X direction). The boundary between the region A and the region B is the boundary between the closed cross-section portion A and the closed cross-section portion B.

Also, instead of the region C, the structural member in the present disclosure may be provided with one or a plurality of a region not shown in the figures including an open cross-section, or a region not shown in the figures including a closed cross-section formed discontinuously to the closed cross-section A, the closed cross-section $B_1$, and the closed cross-section $B_2$, along the direction from edge portion $T_1$ to edge portion $T_2$ (+X direction). That is, the region A and the region B are placed apart from each other, and one or a plurality of a region including an open cross-section, or a region including a closed cross-section formed discontinuously to the closed cross-section A, the closed cross-section $B_1$, and the closed cross-section $B_2$, between the region A and the region B. Instead of region C, a region where the all across the region has an open cross-section is regarded as a region D. That is, the region D is located between the region A and the region B, and includes the open cross-section all across the region. Also, in a plane view of the structural member, the closed cross-section portion A branches toward the closed cross-section portion B, and the region D includes a branch point located at the boundary with the closed cross-section portion A. In the $C_X$-$C_X$ cross-sectional view of FIG. 15A, the cross-sectional shape of the region D is a shape without the bottom portion 2 located in the region C. The boundary line between the region D and the region A is a line parallel to the Y axis direction which crosses the branch point. When an axis parallel to the X axis direction and crosses the branch point is regarded as a $D_X$-$D_X$ axis, and the depth of the concave portion 5 in the region D is regarded as a depth $d_D$, in the $D_X$-$D_X$ cross-sectional view, the depth $d_D$ coincides with the depth $d_B$ at the boundary between the region D and the region B. The boundary line between the region D and the region B is a line parallel to the Y axis which crosses the boundary portion on the $D_X$-$D_X$ axis. The length $L_Dx$ of the region D on the $X_1$ axis may be, for example, 0.2 or less with respect to the length Lx (=$L_{AX}$+$L_{DX}$+$L_{BX}$) of the structural member 10 on the $X_1$ axis. In other words, it may be $L_{DX}/L_X \leq 0.2$.

4. Structural Member

Figure 16:
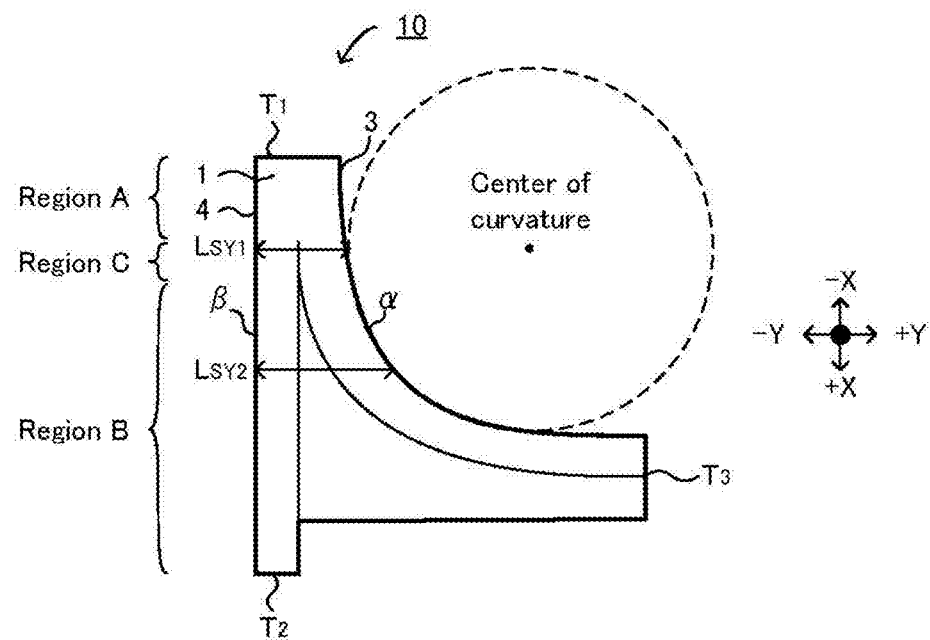
FIG. 16 is a schematic plan view illustrating an example of the structural member in the present disclosure.

The structural member in the present disclosure preferably includes a curved shape in plan view. As shown in FIG. 16, the curved shape is a shape in which the length of structural member 10 in the Y axis direction is enlarged along the +X direction. That is, when the length of structural member 10, in the Y axis direction, at relatively the edge portion $T_1$ side position is regarded as $L_{SY1}$, and the length of structural member 10, in the Y axis direction, at relatively the edge portion $T_2$ side position is regarded as $L_{SY2}$, the curved shape is a shape wherein $L_{SY1} < L_{SY2}$. Strictly speaking, the center of curvature of the inner rim portion α of the curved shape is located on the outer side of the structural member 10. The first wall portion 3 may be placed along the inner rim portion a of the curved shape. Meanwhile, the second wall portion 4 may be placed along the outer rim portion β of the curved shape.

Material constituting the structural member in the present disclosure is not particularly limited, and examples thereof may include metal material such as steel, aluminum alloy, and magnesium alloy; and resin material including resin and fiber such as glass fiber and carbon fiber (for example, CFRP). Also, the structural member may be a composite material of metal material and resin material.

In the present disclosure, it is preferable to use at least a steel plate as a material constituting the structural member. The tensile strength of the metal plate such as a steel plate is not particularly limited, and may be, for example, 780 MPa or more, and may be 980 MPa or more. Also, the thickness of the metal plate such as a steel plate is, for example, 1 mm or more and 3 mm or less.

Figure 17:
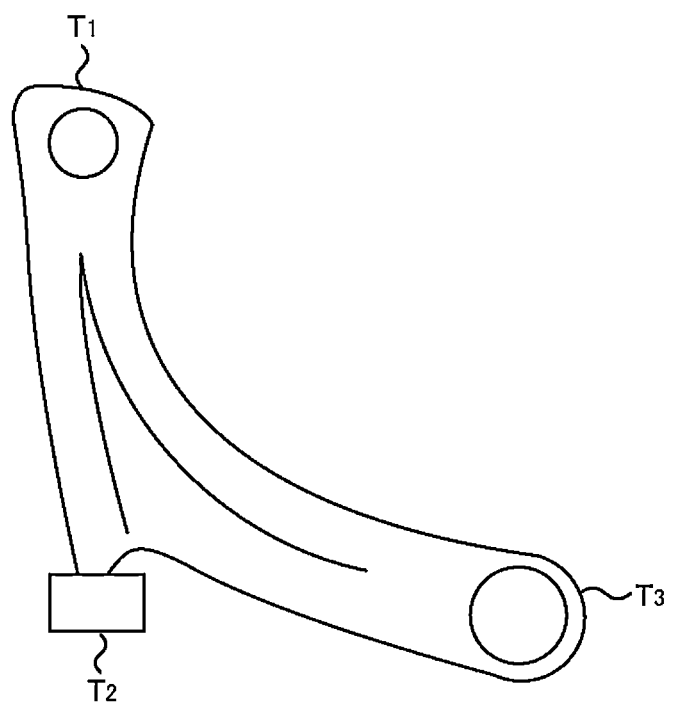
FIG. 17 is a schematic plan view illustrating an example of the structural member in the present disclosure.

The use application of the structural member in the present disclosure is not particularly limited, and examples thereof may include an automotive application. That is, the structural member may be a structural member of an automobile. Examples of the structural member of an automobile may include suspension members such as a front lower arm, a rear lower arm, a front upper arm and a rear upper arm. FIG. 17 is a schematic plan view illustrating an example of the structural member in the present disclosure, and specifically, it is a schematic plan view illustrating an example of a front lower arm. The maximum length of the front lower arm in the front and rear direction of the vehicle (left and right direction of the paper in FIG. 17) is, for example, 260 mm or more and 460 mm or less. The maximum length of the front lower arm in the vehicle width direction (up and down direction of the paper in FIG. 17) is, for example, 300 mm or more and 600 mm or less. The maximum length of the front lower arm in the vehicle height direction (back direction of the paper in FIG. 17) is, for example, 30 mm or more and 100 mm or less. Also, in addition to automobiles, the structural member in the present disclosure may be used for, for example, mobile objects such as motorcycles, ships and aircraft; and for building structures.

The present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Example 1

Figure 18A:
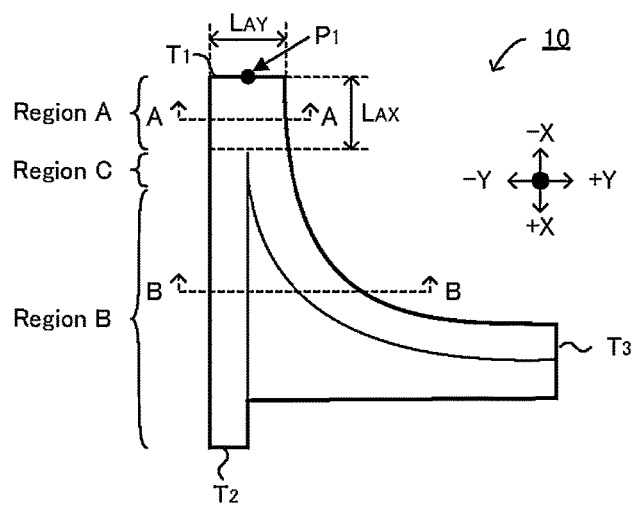
FIG. 18A is a schematic plan view and FIGS. 18B to 18C are schematic cross-sectional views of a shape model of the structural member prepared in Example 1.
Figure 18B:
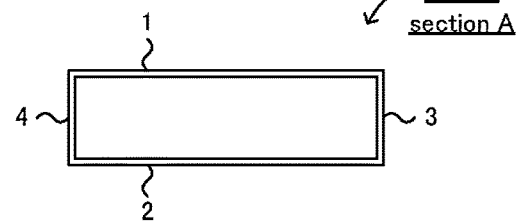
Figure 18C:
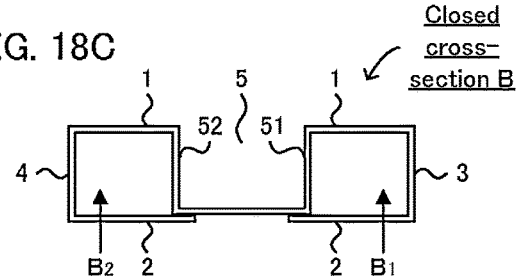

The shape model of the structural member shown in FIGS. 18A to 18C was prepared on a computer using CAD (Computer Aided Design) software. FIG. 18A is a schematic plan view of the shape model of the structural member prepared in Example 1, FIG. 18B is an A-A cross-sectional view of FIG. 18A, and FIG. 18C is a B-B cross-sectional view of FIG. 18A.

The structural member 10 shown in FIG. 18A includes the edge portion $T_1$, the edge portion $T_2$, and the edge portion $T_3$ described above, and further includes the region A, the region B, and the region C. The midpoint of the edge portion $T_1$ in the Y axis direction was regarded as point $P_1$. Also, the $L_{AX}/L_{AY}$ was set to 1.0. $L_{AX}$ was regarded as the length of the region A on the $X_1$ axis (not shown in the figures) which crosses the branch point located at the boundary of the closed cross-section portion A and the closed cross-section portion C, and $L_{AY}$ was regarded as the length of the region A in the Y axis direction at the crossing point of the $X_1$ axis and the edge portion $T_1$. Also, as shown in FIG. 18B, the region A of the structural member 10 shown in FIG. 18A includes the closed cross-section portion A including the closed cross-section A including the top surface portion 1, the bottom surface portion 2, the first wall portion 3 and the second wall portion 4. Meanwhile, as shown in FIG. 18C, the region B in the structural member 10 shown in FIG. 18A includes the closed cross-section portion B including the closed cross-section $B_1$ and the closed cross-section $B_2$ placed apart from each other.

Example 2

A shape model of the structural member was prepared in the same manner as in Example 1, except that $L_{AX}/L_{AY}=2.0$.

Example 3

A shape model of the structural member was prepared in the same manner as in Example 1, except that $L_{AX}/L_{AY}=3.0$.

Reference Example 1

Figure 19A:
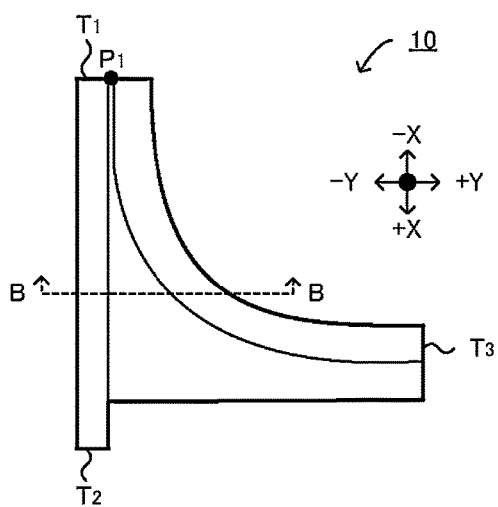
FIG. 19A is a schematic plan view and FIG. 19B is a schematic cross-sectional view of a shape model of the structural member prepared in Reference Example 1.
Figure 19B:
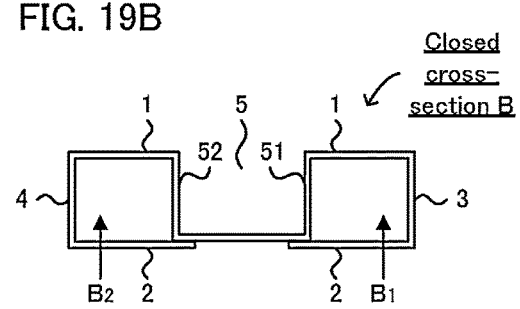

The shape model of the structural member shown in FIGS. 19A and 19B was prepared on a computer using CAD (Computer Aided Design) software. FIG. 19A is a schematic plan view of the shape model of the structural member prepared in Reference Example 1, FIG. 19B is a B-B cross-sectional view of FIG. 19A. A shape model of the structural member was prepared in the same manner as in Example 1, except that the closed cross-section portion B was formed all across the region along the X axis direction, as shown in FIGS. 19A and 19B.

Comparative Example 1

Figure 20A:
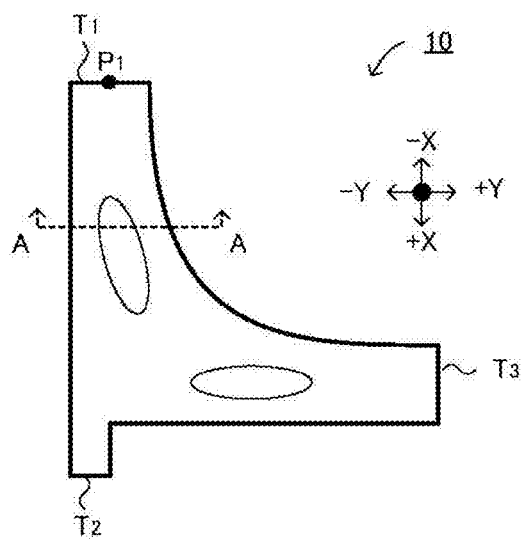
FIG. 20A is a schematic plan view and FIG. 20B is a schematic cross-sectional view of a shape model of the structural member prepared in Comparative Example 1.
Figure 20B:
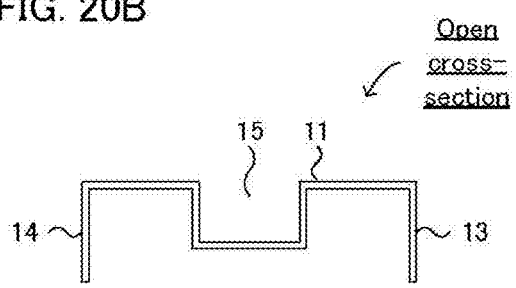

The shape model of the structural member shown in FIGS. 20A and 20B was prepared on a computer using CAD (Computer Aided Design) software. FIG. 20A is a schematic plan view of the shape model of the structural member prepared in Comparative Example 1, and FIG. 20B is an A-A cross-sectional view of FIG. 20A.

A shape model of the structural member was prepared in the same manner as in Example 1, except that, instead of the closed cross-section portion A, the closed cross-section portion B, and the closed cross-section portion C in Example 1, the open cross-section portion including the top surface portion 11 with the concave portion 15 formed thereon, the first wall portion 13 and the second wall portion 14, as shown in FIGS. 20A and 20B, was formed.

[Evaluation]

CAE (Computer Aided Engineering) analysis was carried out on the shape model of the structural members prepared in Examples 1 to 3, Reference Example 1 and Comparative Example 1, the displacement load curve was obtained, and the maximum load [kN] of the curve was calculated. The analysis conditions were that a load in the +Y direction was applied to the point $P_1$ while the edge portion $T_2$ and edge portion $T_3$ were fixed. Also, in relation to the material properties used for the structural members in Examples 1 to 3 and Reference Example 1, a 980 MPa class steel plate with a thickness of 2.3 mm was used, and in Comparative Example 1, a 780 MPa class steel place with a thickness of 3.85 mm was used. The maximum load per unit weight was obtained by dividing the maximum load [kN] by the member weight [kg]. The results are shown in Table 1 and FIG. 21.

TABLE 1

| | Maximum load/member weight [kN/kg] |
|---|---|
| Comparative Example 1 | 14.2 |
| Reference Example 1 | 16.2 |
| Example 1 | 17.8 |
| Example 2 | 17.9 |
| Example 3 | 16.6 |

Figure 21:
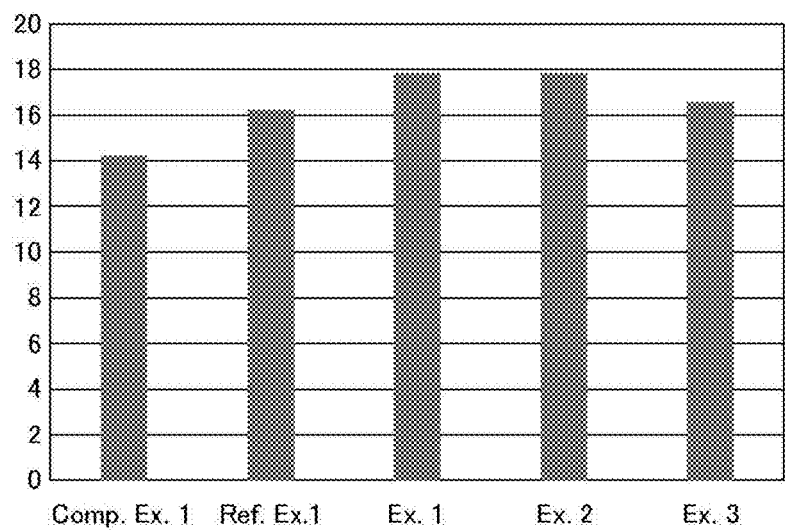
FIG. 21 illustrates the results of the evaluation in Examples 1 to 3, Reference Example 1 and Comparative Example 1.

As shown in Table 1 and FIG. 21, it was confirmed that the maximum load value per unit weight was higher in Examples 1 to 3 than in Comparative Example 1. That is, it was confirmed that the structural members (structural members with a predetermined closed cross-section) in Examples 1 to 3 had a good balance between bending strength and lightweight property compared to the structural member (structural member with an open cross-section) in Comparative Example 1.

Also, it was confirmed that the maximum load value per unit weight was higher in Examples 1 to 3 than in Reference Example 1. The structural member in Reference Example 1 included only a closed cross-section portion B, while the structural member in Example 1 included a closed cross-section portion A with a good lightweight property, in addition to the closed cross-section portion B. This is presumed to be the reason why the structural member with a good balance between bending strength and lightweight property was obtained.

REFERENCE SIGNS LIST

1: top surface portion
2: bottom surface portion
3: first wall portion
4: second wall portion
5: concave portion
10: structural member

The invention claimed is:

1. A structural member comprising an edge portion $T_1$ and an edge portion $T_2$ opposing the edge portion $T_1$ in plan view in height direction (Z axis direction);
when an axis direction connecting the edge portion $T_1$ and the edge portion $T_2$ is regarded as an X axis direction, the structural member comprises an edge portion $T_3$ located on a Y axis direction (an axis direction orthogonal to the X axis direction) side than the edge portion $T_2$, the structural member includes, along the X axis direction, a region A including the edge portion $T_1$, and a region B located on the edge portion $T_2$ side than the region A and including the edge portion $T_2$ and the edge portion $T_3$;
in a cross-section perpendicular to the X axis direction, the region A includes a closed cross-section portion A whose outer rim shape is one closed cross-section A; and
the region B includes a closed cross-section portion B satisfying the following (i) or (ii):
(i) in a cross-section perpendicular to the X axis direction, the closed cross-section portion B includes a closed cross-section $B_1$ and a closed cross-section $B_2$ those are connected via a bottom portion constituting a concave portion, and are placed apart from each other, the closed cross-section $B_1$ extends from the edge portion $T_1$ side to the edge portion $T_3$ side, and the closed cross-section $B_2$ extends from the edge portion $T_1$ side to the edge portion $T_2$ side, or
(ii) in a cross-section perpendicular to the X axis direction, the closed cross-section portion B incudes an open cross-section $B_1$ and an open cross-section $B_2$ those are formed by dividing one closed cross-section B with a concave portion, and in the closed cross-section B, a depth of the concave portion in the Z axis direction is 50% or more with respect to a maximum length of the closed cross-section B in the Z axis direction, the open cross-section $B_1$ extends from the edge portion $T_1$ side to the edge portion $T_3$ side, and the open cross-section $B_2$ extends from the edge portion $T_1$ side to the edge portion $T_2$ side.

2. The structural member according to claim 1, wherein the closed cross-section portion B satisfies the (i).

3. The structural member according to claim 1, wherein the closed cross-section portion B satisfies the (ii).

4. The structural member according to claim 1, wherein, along a direction (+X direction) from the edge portion $T_1$ to the edge portion $T_2$, a shape of a closed cross-section portion, in a cross-section perpendicular to the X axis direction of the structural member, is formed so as to be varied continuously from the closed cross-section portion A to the closed cross-section portion B.

5. The structural member according to claim 1, wherein, in plan view in the height direction (Z axis direction), and a length of the structural member in the Y axis direction is regarded as $L_{SY}$, the structural member has a curved shape in which the $L_{SY}$ is enlarged along a direction (+X direction) from the edge portion $T_1$ to the edge portion $T_2$; and
the closed cross-section $B_1$ is placed along an inner rim portion of the curved shape, and the closed cross-section $B_2$ is placed along an outer rim portion of the curved shape.

6. The structural member according to claim 1, wherein, in plan view in the height direction (Z axis direction), an arbitrary axis parallel to the X axis direction and crosses the edge portion $T_2$ is regarded as an $X_1$ axis, a length of the region A in the $X_1$ axis is regarded as $L_{AX}$, and a length of the region A in the Y axis direction at an arbitrary point $P_A$ on the $X_1$ axis in the region A is regarded as $L_{AY}$, $L_{AX}/L_{AY}$ satisfies 1.0 or more and 4.0 or less at least at any one of the point $P_A$.

7. The structural member according to claim 1, wherein the closed cross-section portion B is constituted with one member.

8. The structural member according to claim 1, wherein the closed cross-section portion B is constituted with two or more members.

9. The structural member according to claim 1, wherein the structural member is a structural member of an automobile.

10. The structural member according to claim 1, wherein the structural member is a front lower arm.

11. The structural member according to claim 1, wherein at least a steel plate is used as a material constituting the structural member, and a tensile strength of the steel plate is 780 MPa or more.

* * * * *